US012573352B2

(12) United States Patent
Rotti et al.

(10) Patent No.: US 12,573,352 B2
(45) Date of Patent: Mar. 10, 2026

(54) MULTI-STEP DISPLAY MAPPING AND METADATA RECONSTRUCTION FOR HIGH DYNAMIC RANGE VIDEO

(71) Applicant: Dolby Laboratories Licensing Corporation, San Francisco, CA (US)

(72) Inventors: Shruthi Suresh Rotti, Mountain House, CA (US); Jaclyn Anne Pytlarz, San Jose, CA (US); Robin Atkins, Vancouver (CA); Subhadra Gopalakrishnan, Santa Clara, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 18/694,366

(22) PCT Filed: Sep. 28, 2022

(86) PCT No.: PCT/US2022/077127
§ 371 (c)(1),
(2) Date: Mar. 21, 2024

(87) PCT Pub. No.: WO2023/056267
PCT Pub. Date: Apr. 6, 2023

(65) Prior Publication Data
US 2024/0249701 A1 Jul. 25, 2024

Related U.S. Application Data

(60) Provisional application No. 63/316,099, filed on Mar. 3, 2022, provisional application No. 63/249,183, filed on Sep. 28, 2021.

(30) Foreign Application Priority Data

Nov. 24, 2021 (EP) .................................... 21210178

(51) Int. Cl.
*G09G 5/10* (2006.01)

(52) U.S. Cl.
CPC ....... *G09G 5/10* (2013.01); *G09G 2320/0233* (2013.01)

(58) Field of Classification Search
CPC ...................... G09G 5/026; G09G 2320/0666
See application file for complete search history.

(56) References Cited

U.S. PATENT DOCUMENTS 8,593,480 B1 11/2013 Ballestad
9,961,237 B2 5/2018 Atkins
(Continued)

FOREIGN PATENT DOCUMENTS

JP 2015035798 A 2/2015
JP 2020524446 A 8/2020
(Continued)

*Primary Examiner* — Kwang-Su Yang

(57) ABSTRACT

Methods and systems for multi-step display mapping and metadata reconstruction for high dynamic range (HDR) images are described. In an encoder, given an HDR input image with input HDR metadata in a first dynamic range, an intermediate, base layer image in a second dynamic range is constructed based on the input image. In a decoder, using base-layer metadata, the input HDR metadata, and dynamic range characteristics of a target display, a processor generates reconstructed metadata which when used in combination with the base layer image allow a display mapping process to map the base layer image to the target display as if it was mapping directly the HDR image to the target display.

16 Claims, 6 Drawing Sheets

(56) References Cited

U.S. PATENT DOCUMENTS

| | | | | |
|---|---|---|---|---|
| 10,600,166 | B2 * | 3/2020 | Pytlarz | G06T 5/92 |
| 10,609,395 | B2 | 3/2020 | Kerofsky | |
| 11,151,962 | B2 | 10/2021 | Van De Kerkhof | |
| 11,288,781 | B2 | 3/2022 | Gadgil | |
| 2010/0150105 | A1 * | 6/2010 | Miao | H04L 65/762<br>370/331 |
| 2010/0158471 | A1 * | 6/2010 | Ogikubo | H04N 21/84<br>375/E7.026 |
| 2018/0278963 | A1 | 9/2018 | Schueuer | |
| 2019/0222866 | A1 | 7/2019 | Song | |
| 2020/0005441 | A1 | 1/2020 | Pytlarz | |
| 2020/0193935 | A1 | 6/2020 | Van De Kerkhof | |
| 2021/0092461 | A1 | 3/2021 | Gadgil | |

FOREIGN PATENT DOCUMENTS

| | | | |
|---|---|---|---|
| JP | 2020532805 | A | 11/2020 |
| WO | 2014163793 | A2 | 10/2014 |
| WO | 2020219341 | A1 | 10/2020 |

* cited by examiner

MULTI-STEP DISPLAY MAPPING AND METADATA RECONSTRUCTION FOR HIGH DYNAMIC RANGE VIDEO

CROSS-REFERENCE TO RELATED APPLICATIONS

This application is a U.S. National Stage application under U.S.C. 371 of International Application No. PCT/US2022/077127, filed on Sep. 28, 2022, which claims the benefit of priority from U.S. Provisional Patent Application No. 63/249,183 filed on 28 Sep. 2021; European Patent Application No. 21210178.6 filed on 24 Nov. 2021; and U.S. Provisional Patent Application No. 63/316,099 filed on 3 Mar. 2022, each one included by reference in its entirety.

TECHNOLOGY

The present invention relates generally to images. More particularly, an embodiment of the present invention relates to the dynamic range conversion and display mapping of high dynamic range (HDR) images.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). For example, using gamma luminance coding, images where $n \leq 8$ (e.g., color 24-bit JPEG images) are considered images of standard dynamic range, while images where $n \geq 10$ may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, minimum, average, and maximum luminance values in an image, color space or gamut information, reference display parameters, and auxiliary signal parameters, as those described herein.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

As used herein, the term "display management" refers to processes that are performed on a receiver to render a picture for a target display. For example, and without limitation, such processes may include tone-mapping, gamut-mapping, color management, frame-rate conversion, and the like.

The creation and playback of high dynamic range (HDR) content is now becoming widespread as HDR technology offers more realistic and lifelike images than earlier formats; however, HDR playback may be constrained by requirements of backwards compatibility or computing-power limitations. To improve existing display schemes, as appreciated by the inventors here, improved techniques for the display management of images and video onto HDR displays are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
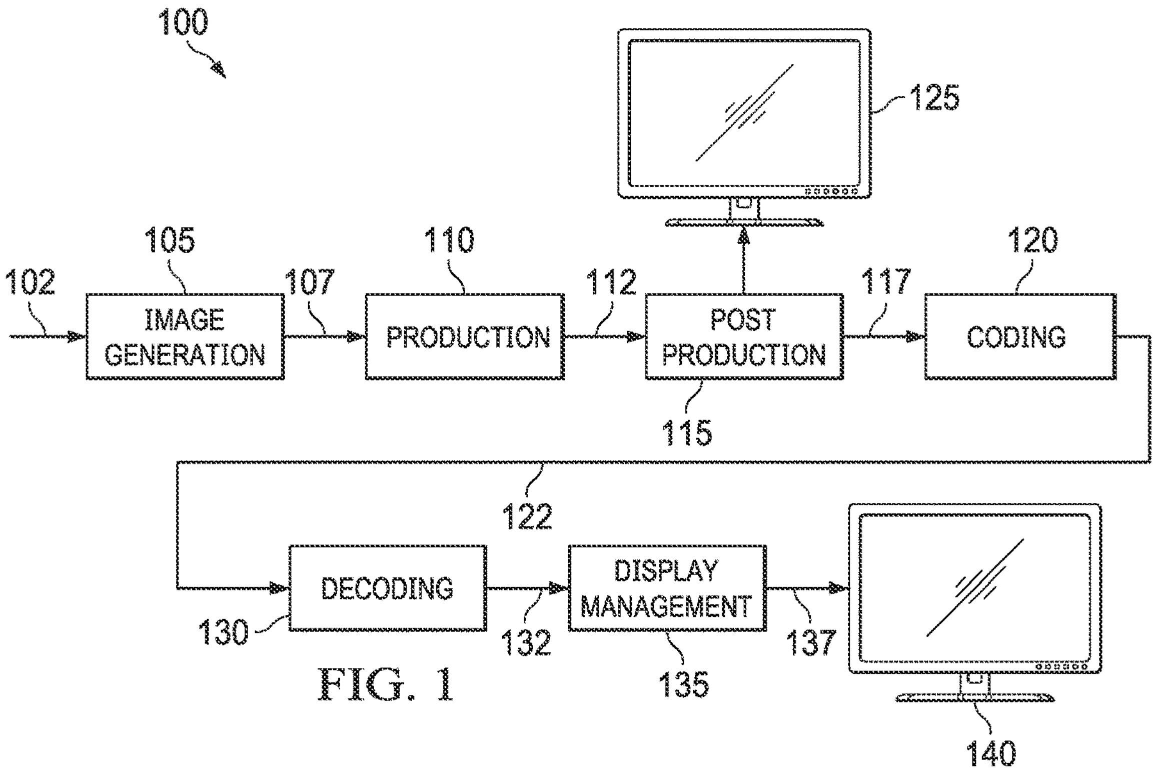
FIG. 1 depicts an example process for a video delivery pipeline.

Methods for multi-step dynamic range conversion and display management for HDR images and video are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Summary

Example embodiments described herein relate to methods for multi-step dynamic range conversion and display management of images onto HDR displays. In an embodiment, a processor receives input metadata (204) for an input image in a first dynamic range;

- accesses a base layer image (212) in a second dynamic range, wherein the base layer image was generated based on the input image;
- accesses base-layer parameters (208) determining the second dynamic range;
- accesses display parameters (230) for a target display with a target dynamic range;
- generates reconstructed metadata based on the input metadata, the base-layer parameters, and the display parameters;
- generates an output mapping curve based on the reconstructed metadata and the display parameters to map the base layer image to the target display; and
- maps using the output mapping curve the base layer image to the target display in the target dynamic range.

In a second embodiment, a processor receives an input image (202) in a first dynamic range;

- accesses input metadata (204) for the input image;
- accesses base-layer parameters (208) determining a second dynamic range;
- generates (210) a base layer image in the second dynamic range based on the input image, the base-layer parameters, and the input metadata;
- accesses display parameters (240) for a target display with a target dynamic range;
- generates reconstructed metadata based on the input metadata, the base-layer parameters, and the display parameters; and
- generates an output bitstream comprising the base layer image and the reconstructed metadata.

Multi-Step Image Mapping and Display Management Video Coding Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g., by a digital camera) or generated by a computer (e.g., using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g., scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137). Without limitations, examples of display management processes are described in Refs. [1] and [2].

Single-Step and Multi-Step Display Mapping

In traditional display mapping (DM), the mapping algorithm applies a sigmoid like function (for examples, see Refs [3] and [4]) to map the input dynamic range to the dynamic range of the target display. Such mapping functions may be represented as piece-wise linear or non-linear polynomials characterized by anchor points, pivots, and other polynomial parameters generated using characteristics of the input source and the target display. For example, in Refs. [3-4] the mapping functions use anchor points based on luminance characteristics (e.g., the minimum, medium (average), and maximum luminance) of the input images and the display. However, other mapping functions may use different statistical data, such as luminance-variance or luminance-standard deviation values at a block level or for the whole image. For SDR images, the process may also be assisted by additional metadata which are either transmitted as part of the transmitted video or they are computed by the decoder or the display. For example, when the content provider has both SDR and HDR versions of the source content, a source may use both versions to generate metadata (such as piece-wise linear approximations of forward or backward reshaping functions) to assist the decoder in converting incoming SDR images to HDR images.

In a typical workflow of HDR data transmission, as in Dolby Vision®, the display mapping (135) can be considered as a single-step process, performed at the end of the processing pipeline, before an image is displayed on the target display (140); however, there might be scenarios where it may be required or otherwise beneficial to do this mapping in two (or more) processing steps. As an example, a Dolby Vision (or other HDR format) transmission profile may use a base layer of video coded in HDR10 at 1,000 nits, to support television sets that don't support Dolby Vision, but which do support the HDR10 format.

Then a typical workflow process may include the following steps:

1) Map the input images or video from the original HDR master to a "base layer" (e.g., 1000 nits, ITU-R Rec. 2020) using Dolby Vision or another format 2) Compute static or dynamic composer metadata that will reconstruct the original HDR master image from the mapped base layer
3) Encode the mapped base layer and embed the original HDR metadata (e.g., min, mid, and max luminance values), and transmit downstream to decoding devices along with the composer metadata
4) At playback, decode the coded bitstream, and then: a) apply the composer metadata to the base layer to reconstruct the original HDR image from the base layer, and then b) map the reconstructed image to the target display using the original HDR metadata (same as the single-step mapping)

This workflow has the drawback of requiring two image processing operations at playback: a) compositing (or prediction) to reconstruct the HDR input and b) display mapping, to map the HDR input to the target display. In some devices it may be desirable to perform only a single mapping operation by bypassing the composer. This may require less power consumption and/or may simplify implementation and processing complexity. In an example embodiment, an alternate multi-stage workflow is described which allows a first mapping to a base layer, followed by a second mapping directly from the base layer to the target display, by bypassing the composer. This approach can be further expanded to include subsequent steps of mapping to additional displays or bitstreams.

Figure 2A:
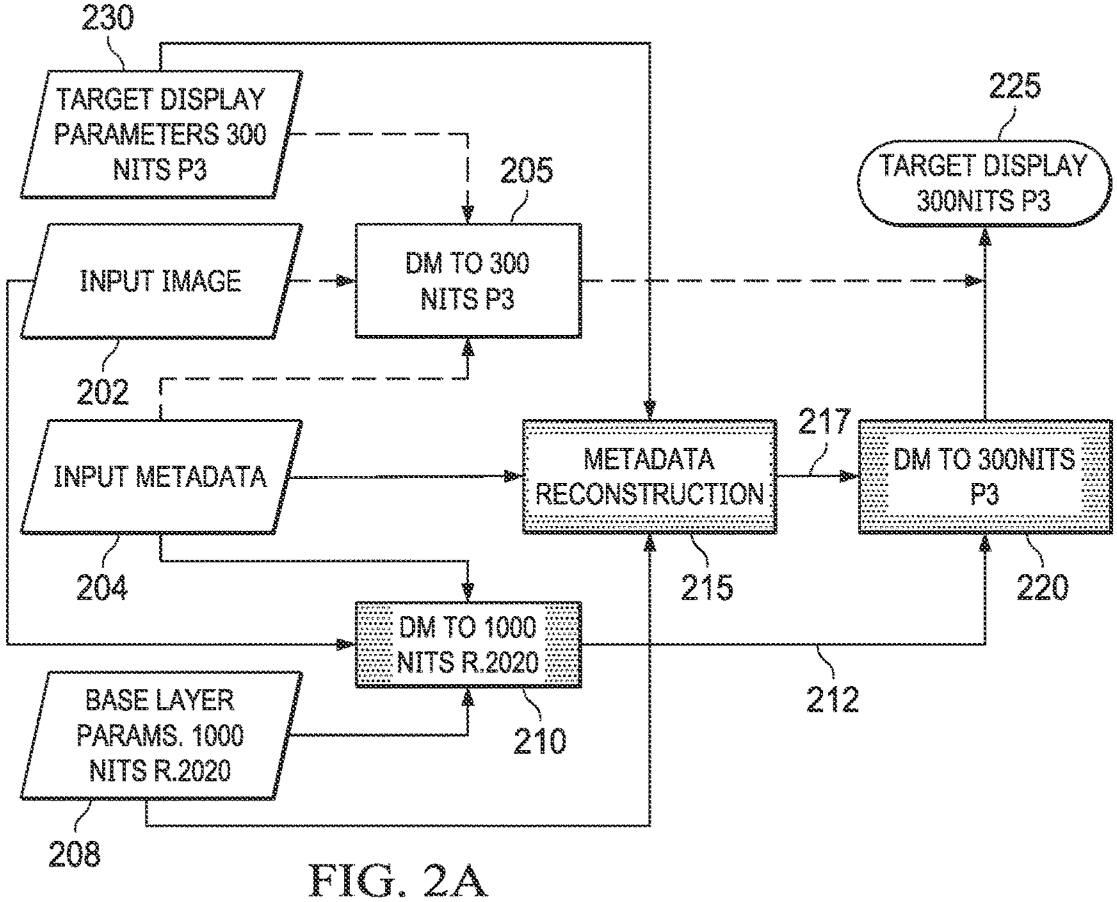
FIG. 2A depicts an example process for multi-stage display mapping according to an embodiment of the present invention.

FIG. 2A depicts an example process for multi-stage display mapping. Dotted lines and display mapping (DM) unit 205 indicate the traditional single-stage mapping. In this example, without limitation, an input image (202) and its metadata (204) need to be mapped to a target display (225) at 300 nits and the P3 color gamut. The characteristics of the target display (230) (e.g., min and maximum luminance and color gamut), together with the input (202) and its metadata (e.g., min, mid, max luminance) (204) are fed to a display mapping (DM) process (205), which maps the input to the dynamic range of the target display (225).

Solid lines and shaded blocks indicate the multi-stage mapping. The input image (202), input metadata (204) and parameters related to the base layer (208) are fed to display mapping unit (210) to create a mapped base layer (212) (e.g., from the input dynamic range to 1,000 nits at Rec. 2020). This step may be performed in an encoder (not shown). During playback, a new processing block, metadata reconstruction unit (215), using the target display parameters (230), base-layer parameters (208), and the input image metadata (204), adjusts the input image metadata to generate reconstructed metadata (217) so that a subsequent mapping (220) of the mapped base layer (212) to the target display (225) would be visually identical to the result of the single-step mapping (205) to the same display.

For existing (legacy) content comprising a base layer and the original HDR metadata, the metadata reconstruction block (215) is applied during playback. In some cases, the base layer target information (208) may be unavailable and may be inferred based on other information (e.g., in Dolby Vision, using the profile information (e.g., Profile 8.4, 8.1, etc.). It is also possible that the mapped base layer (212) is identical to the original HDR master (e.g., 202), in which case metadata reconstruction may be skipped.

In some embodiments, the metadata reconstruction (215) may be applied at the encoder side. For instance, due to limited power or computational resources in mobile devices (e.g., phones, tablets, and the like) it may be desired to pre-compute the reconstructed metadata to save power at the decoder device. This new metadata may be sent in addition to the original HDR metadata, in which case, the decoder can simply use the reconstructed metadata and skip the reconstruction block. Alternatively, the reconstructed metadata may replace part of the original HDR metadata.

Figure 2B:
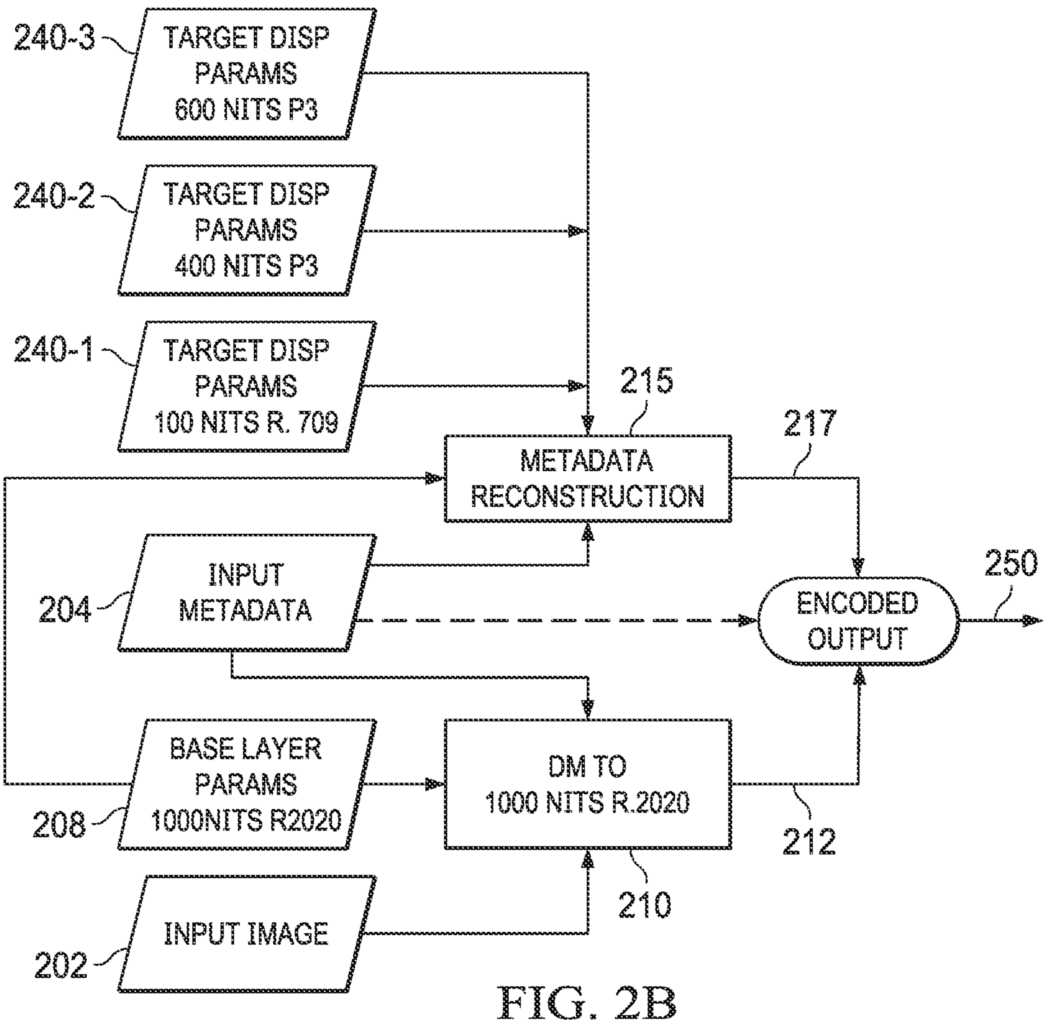
FIG. 2B depicts an example process for generating a bitstream supporting multi-stage display mapping according to an embodiment of the present invention.

FIG. 2B depicts an example process for reconstructing metadata in an encoder to prepare a bitstream suitable for multi-step display mapping. Given that an encoder is unlikely to know the characteristics of the target display, metadata reconstruction may be applied based on characteristics of more than one potential display, for example at 100 nits, Rec. 709 (240-1), 400 nits, P3 (240-2), 600 nits, P3 (240-3), and the like. The base layer (212) is constructed as before, however now the metadata reconstruction process will consider multiple target displays in order to have an accurate match for a wide variety of displays. The final output (250) will combine the base layer (212), the reconstructed metadata (217), and parts of the original metadata (204) that are not affected by the metadata reconstruction process.

Metadata Reconstruction

During metadata reconstruction, part of the original input metadata (for an input image in an input dynamic range) in combination with information about the characteristics of a base layer (available in an intermediate dynamic range) and the target display (to display the image in a target dynamic range) generates reconstructed metadata for a two-stage (or multi-stage) display mapping. In an example embodiment, the metadata reconstruction happens in four steps.

Step 1: Single Step Mapping

As used herein, the term "L1 metadata" denotes minimum, medium, and maximum luminance values related to an input frame or image. L1 metadata may be computed by converting RGB data to a luma-chroma format (e.g., YCbCr) and then computing min, mid (average), and max values in the Y plane, or they can be computed directly in the RGB space. For example, in an embodiment, L1Min denotes the minimum of the PQ-encoded min(RGB) values of the image, while taking into consideration an active area (e.g., by excluding gray or black bars, letterbox bars, and the like). min(RGB) denotes the minimum of color component values {R, G, B} of a pixel. The values of L1Mid and L1Max may also be computed in a same fashion replacing the min( ) function with the average( ) and max( ) functions. For example, L1Mid denotes the average of the PQ-encoded max(RGB) values of the image, and L1Max denotes the maximum of the PQ-encoded max(RGB) values of the image. In some embodiments, L1 metadata may be normalized to be in [0, 1].

Figure 3A:
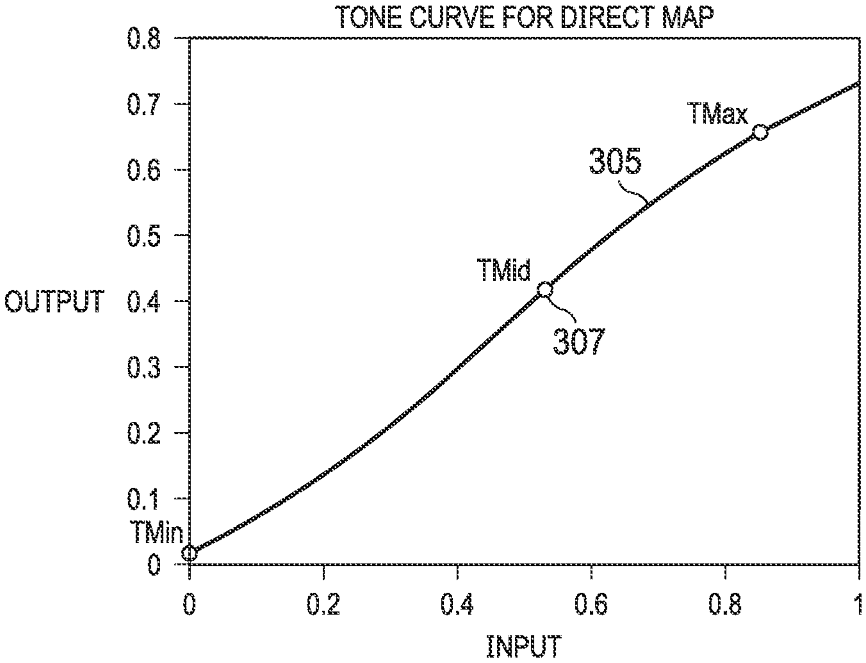
FIGS. 3A, 3B, 3C, and 3D depict examples of tone-mapping curves for generating reconstructed metadata in multi-stage display mapping according to an embodiment of the present invention.

Consider the L1Min, L1Mid, and L1Max values of the original HDR metadata, as well as the maximum (peak) and minimum (black) luminance of the target display, denoted as Tmax and Tmin. Then, as described in Ref. [3-4], one may generate an intensity tone-mapping mapping curve mapping the intensity of the input image to the dynamic range of the target display. An example of such a curve (305) is depicted in FIG. 3A. This may be considered to be the ideal, single-stage, tone-mapping curve, to be matched by using the reconstructed metadata. Using this direct tone-mapping curve one maps the L1Min, L1Mid, and L1Max values to corresponding TMin, TMid, and TMax values. In FIGS. 3A-3D all input and output values are shown in the PQ domain using SMPTE ST 2084. All other computed metadata values (e.g., BLMin, BLMid, BLMax, TMin, TMid, TMax, and TMin', TMid', TMax') are also in the PQ domain.

Step 2: Mapping to the Base Layer

Figure 3B:
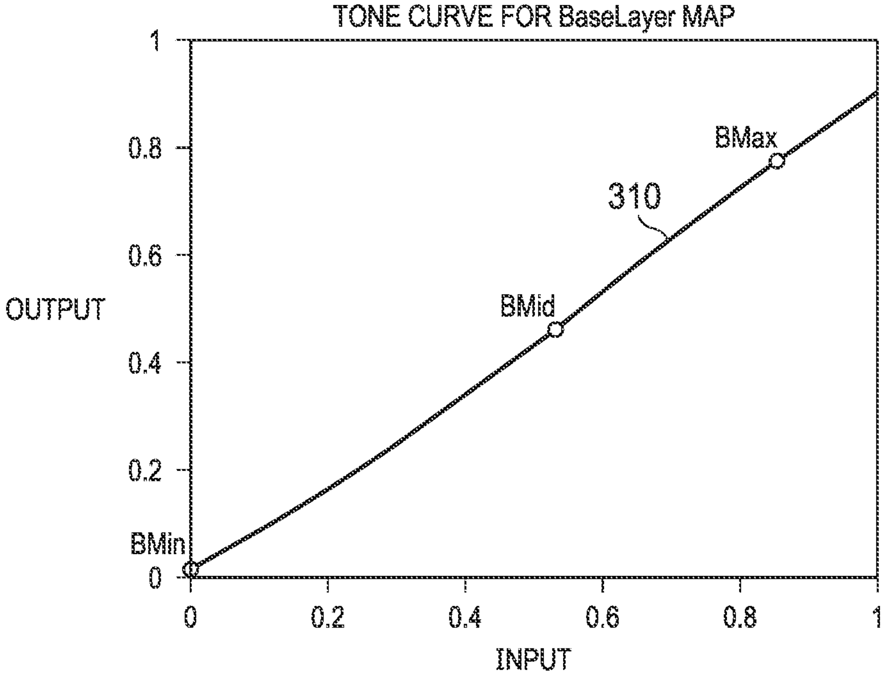

Consider as inputs the L1Min, L1Mid, and L1Max values of the original HDR metadata, as well as the Bmin and Bmax values of the Base Layer parameters (208) which denote the black level (min luminance) and peak luminance of the base layer stream. Again, one can derive a first intensity mapping curve to map the input data to the Bmin and Bmax range values. An example of such a curve (310) is depicted in FIG. 3B. Using this curve, the original L1 values can be mapped to BLMin, BLMid, and BLMax values to be used as the reconstructed L1 metadata for the third step.

Step 3: Mapping from Base Layer to Target

Figure 3C:
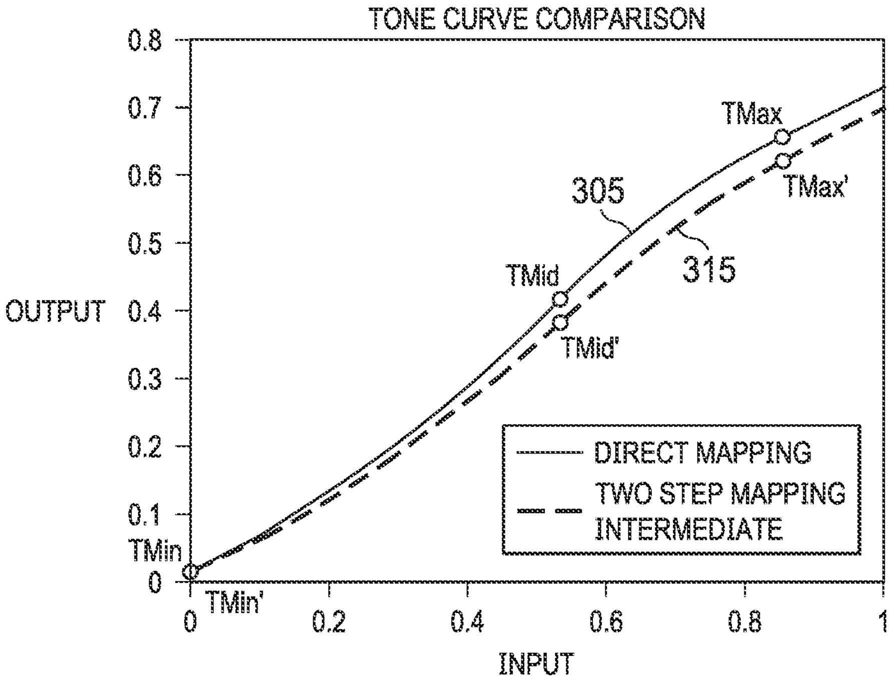

Take BLMin, BLMid, and BLMax from Step 2 as updated L1 metadata and map them using a second display management curve to the target display (e.g., in Tmin and Tmax). Using the second curve, the corresponding mapped values of BLMin, BLMid, and BLMax are denoted as TMin', TMid', and TMax'. In FIG. 3C, curve (315) shows an example of this mapping. Curve (305) represents the single-stage mapping. The goal is to match the two curves.

Step 4: Matching Single-Step and Multi-Step Mappings

As used herein, the term "trims" denotes tone-curve adjustments performed by a colorist to improve tone mapping operations. Trims are typically applied to the SDR range (e.g., 100 nits maximum luminance, 0.005 nits minimum luminance). These values are then interpolated linearly to the target luminance range depending only on the maximum luminance. These values modify the default tone curve and are present for every trim.

Information about the trims may be part of the HDR metadata and may be used to adjust the tone-mapping curves generated in Steps 1-2 (see Ref. [1-4] and equations (4-8) below). For example, in Dolby Vision, trims may be passed as Level 2 (L2) or Level 8 (L8) metadata that includes Slope, Offset, and Power variables (collectively referred to as SOP parameters) representing Gain and Gamma values to adjust pixel values. For example, if Slope, Offset, and Power are in [−0.5, 0.5], then, given Gain and Gamma:

$$\text{Slope} = \max(-0.5, \min(0.5, \text{Gain} * (1 - \text{Lift}) - 1)) \tag{1}$$

$$\text{Offset} = \max(-0.5, \min(0.5, \text{Gain} * \text{Lift}))$$

$$\text{Power} = \max\left(-0.5, \min\left(0.5, 1/\text{Gamma} - 1\right)\right)$$

In an embodiment, in order to match the two mapping curves, one may also need to use reconstructed metadata related to the trims. One generates Slope, Offset, Power and TMidContrast values to match [TMin', TMid' and TMax'] from Step 3 to [TMin, TMid, TMax] from Step 1. This will be used as the new (reconstructed) trim metadata (e.g., L8 and/or L2) for the reconstructed metadata.

The Slope, Offset and Power Calculation:

The purpose of Slope, Offset, Power and TMidContrast calculation is to match the [TMin', TMid' and TMax'] from Step 2 to the [TMin, TMid, TMax] from Step 1. They relate to each other by the following equations:

$$T\text{Min} = (\text{Slope} * T\text{Min'} + \text{Offset})^{\text{Power}} \tag{2}$$

$$TMid = (\text{Slope} * TMid' + \text{Offset})^{\text{Power}}$$

$$T\text{Max} = (\text{Slope} * T\text{Max'} + \text{Offset})^{\text{Power}}$$

This is a system of three equations with three unknowns and can be solved as follows:

1. First, solve for Power using a Taylor Series Expansion approximation.

$$\text{delta} = (TMid - TMid')/(T\text{Max'} - T\text{Min'})$$

$$A = T\text{Max};\ B = TMid;\ C = T\text{Min} + 1/4096$$

$$q = 1 + (B - (1 - \text{delta}) * A - \text{delta} * C)/((1 - \text{delta}) * A * \log(A) + \text{delta} * C * \log(\text{abs}(C) * \text{sign}(C)) - B * \log(B))$$

$$\text{Power} = 1/q$$

2. Use the Power value to calculate Slope and Offset as follows.

$$\text{Slope} = \left(T\text{Max}^{1/Power}\right) - T\text{Min}^{1/Power}/(T\text{Max'} - T\text{Min'})$$

$$\text{Offset} = \left(T\text{Min}^{1/Power}\right) - (\text{Slope} * T\text{Min'})$$

3. To calculate the TMidContrast $$\text{TMid\_delta} = DirectMap\left(L1Mid + 1/4096\right) \tag{3}$$

$$\text{TMid'\_delta} = MultiStepMap\left(L1Mid + 1/4096\right)$$

$$gammaTR = \text{TMid\_delta} - TMid + (TMid' * \text{Slope} + \text{Offset})^{Power}$$

$$\text{gamma} = \left(\left(gammaTR^{1/Power}\right) - \text{Offset}\right)/\text{Slope}$$

$$TMidContrast = (\text{gamma} - \text{TMid'\_delta}) * 4096$$

where DirectMap( ) denotes the tone-mapping curve from Step 1 and MultiStepMap( ) denotes the second tone-mapping curve, as generated in Step 3.

Consider a tone curve y(x) generated according to input metadata and Tmin and Tmax values (e.g., see Ref. [4]), then TMidContrast updates the slope (slopeMid) at the center (e.g., see the (L1Mid, TMid) point (307) in FIG. 3A) as follows:

$$slopeMid = slopeMid + TMidContrast \tag{4}$$

Then, Slope, Offset and Power may be applied as follows: (5)

$$y(x) = ((\text{Slope} * y(x)) + \text{Offset})^{Power}.$$

In some embodiments, the Slope, Offset, and Power may be applied in a normalized space. This has the advantage of reducing likelihood of clipping when applying the Power term. In this case prior to the Slope, Offset, and Power application, normalization may happen as follows:

$$y(x) = (y(x) - T\text{min}PQ)/(T\text{max}PQ - T\text{min}PQ). \tag{6}$$

Then after applying the Slope, Offset, and Power terms in equation (5), the de-normalization may happen as follows:

$$y(x) = y(x) * (TmaxPQ - TminPQ) + TminPQ. \quad (7)$$

TmaxPQ and TminPQ denote PQ-coded luminance values corresponding to the linear luminance values Tmax and Tmin, which have been converted to PQ luminance using SMPTE ST 2084. In an embodiment, TmaxPQ and TminPQ are in the range [0,1], expressed as [0 to 4095]/4095. In this case, normalization of [TMin, TMid, TMax] and [TMin', TMid', TMax'] would occur before STEP 1 of computing Slope, Offset and Power. Then, TMidContrast in STEP 3 (see equation (3)) would be scaled by (TmaxPQ−TminPQ), as in $$TMidContrast = (\text{gamma} - \text{TMid'\_delta}) * (TmaxPQ - TminPQ) * 4096. \quad (8)$$

Figure 3D:
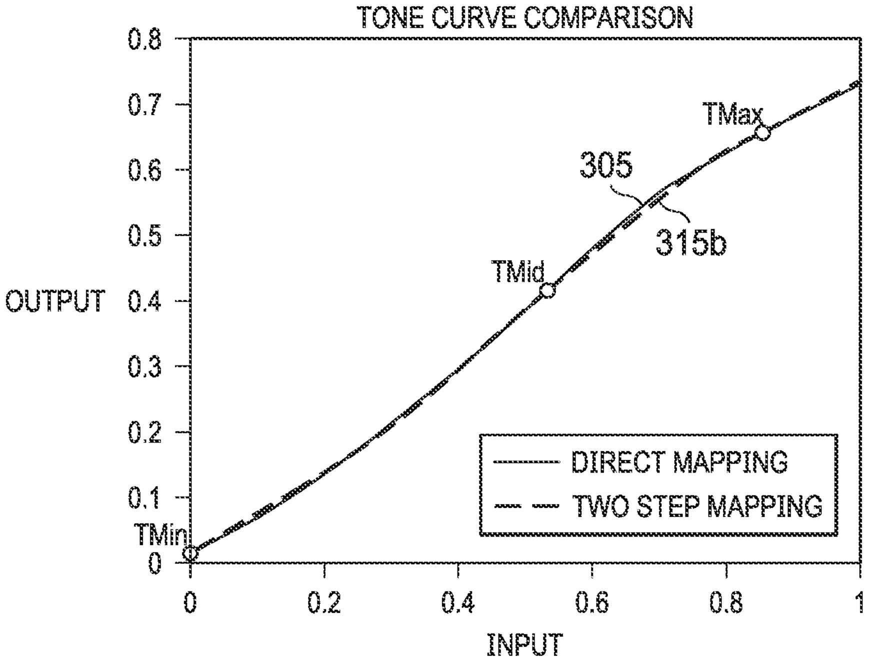

As an example, in FIG. 3D, curve 315*b* depicts how curve 315 is adjusted to match curve 305 after applying the trim parameters Slope, Offset, Power, and TMidContrast.

Figure 4:
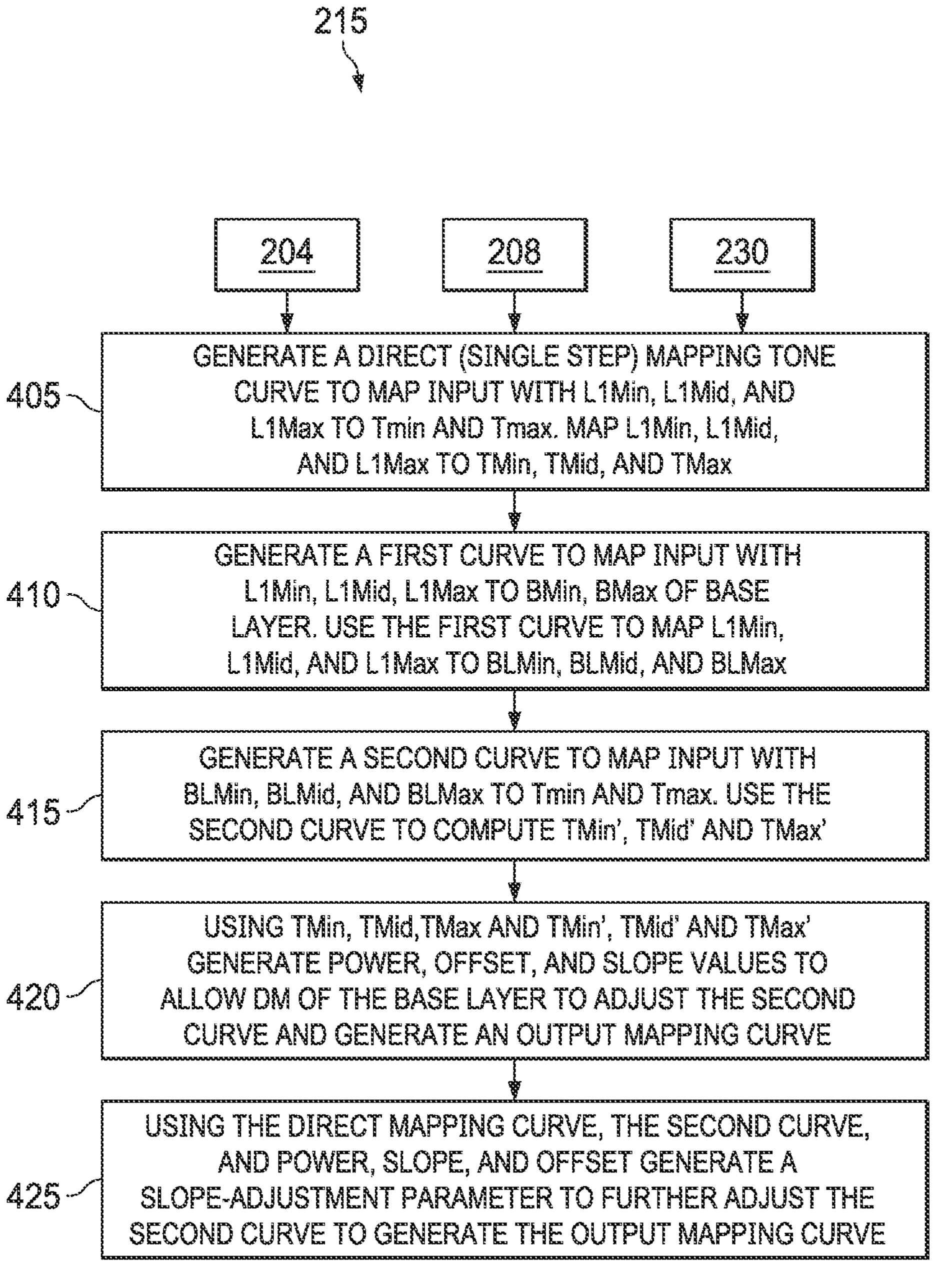
FIG. 4 depicts an example process for metadata reconstruction according to an example embodiment of the present invention.

FIG. 4 depicts an example process summarizing the metadata reconstruction process (215) according to an embodiment and the steps described earlier. As depicted in FIG. 4, input to process are: input metadata (204), Base Layer characteristics (208), and target display characteristics (230).

Step 405 generates using the input metadata and the target display characteristics (e.g., Tmin, Tmax) a direct or single-step mapping tone curve (e.g., 305). Using this direct mapping curve, input luminance metadata (e.g., L1Min, L1Mid, and L1Max) are converted to direct-mapped metadata (e.g., TMin, TMid, and TMax).

Step 410 generates using the input metadata and the Base Layer characteristics (e.g., Bmin and Bmax) a first, intermediate, mapping curve (e.g., 310). Using this curve, one generates a first set of reconstructed luminance metadata (e.g., BLMin, BLMid, and BLMax) corresponding to luminance values in the input metadata (e.g., L1Min, L1Mid, and L1Max).

Step 415 generates a second mapping curve mapping an input with BLMin, BLMid, and BLMax values to the target display (e.g., using Tmin and Tmax). The second tone mapping curve (e.g., 315) can be used to map the first set of reconstructed metadata values (e.g., BLMin, BLMid, and BLMax) generated in Step 410 to mapped reconstructed metadata values (e.g., TMin', TMid', and TMax').

Step 420 generates some additional reconstructed metadata (e.g., SOP parameters Slope, Offset, and Power) to be used to adjust the second tone-mapping curve. This step requires using the direct-mapped metadata values (TMin, TMid, and TMax) and the corresponding mapped reconstructed metadata values (TMin', TMid', and TMax'), and solving a system of at least three equations with three unknowns: Slope, Offset, and Power.

Step 425 uses the SOP parameters, the direct mapping curve, and the second mapping curve to generate a slope-adjusting parameter (TMidContrast) to further adjust the second-mapping curve.

The output reconstructed metadata (212) includes: reconstructed luminance metadata (e.g., BLMin, BLMid, and BLMax) and reconstructed or new trim-pass metadata (e.g., TMidContrast, Slope, Power, and Offset). These reconstructed metadata can be used in a decoder to adjust the second mapping curve and generate an output mapping curve to map the base layer image to the target display.

Returning to FIG. 2A, the display mapping process 220 will:

a. generate a tone mapping curve (y(x)) mapping the intensity of the base layer with reconstructed metadata values BLMin, BLMid, and BLMax to Tmin and Tmax values of the target display (225)
b. update this tone mapping curve using the trim-pass metadata (e.g., TMidContrast, Slope, Power, and Offset) as described earlier (e.g., see equations (4-8)).

In an embodiment, one may generate the tone curves by using different sampling points than L1Min, L1Mid, and L1Max. For example, since one samples only a few luminance range points, choosing a curve point closer to the center may result in an improved overall curve match. In another embodiment, one may consider the entire curve during optimization instead of just the three points. In addition, improvements may be made by allowing a solution with less precision tolerance if the difference between TMid and TMid' is very small. For example, allowing for a small tolerance difference (e.g., such as 1/720) between points instead of solving for them exactly may result in smaller trims and an overall better curve match.

The tone-map intensity curve, as mentioned in step 1, is the tone curve of display management. It is suggested that this curve is as close as possible to the curve that'll be used both in base layer generation and on the target display. Hence, the version or design of the curve may be different depending on the type of content or playback device. For example, a curve generated according to Ref. [4] may not be supported by older legacy devices which only recognize building a curve according to Ref. [3]. Since not all DM curves are supported on all playback devices, the curve used when calculating tone map intensity should be chosen based on the content type and characteristics of the particular playback device. If the exact playback device is not known (such as when metadata reconstruction is applied in encoding), the closest curve may be chosen, but the resulting image may be further away from the Single Step Mapping equivalent.

Metadata Adjustment for Global Dimming Metadata

As used herein, the term "L4 metadata" or "Level 4 metadata" refers to signal metadata that can be used to adjust global dimming parameters. In an embodiment of Dolby Vision processing, without limitation, L4 metadata includes two parameters: FilteredFrameMean and FilteredFramePower, as defined next.

FilteredFrameMean (or for short, mean_max) is computed as a temporarily filtered mean output of the frame maximum luminance values (e.g., the PQ-encoded maximum RGB values of each frame). In an embodiment, this temporal filtering is reset at scene cuts, if such information is available. FilteredFramePower (or for short, std_max) is computed as a temporarily filtered standard-deviation output of the frame maximum luminance values (e.g., the PQ-encoded maximum RGB values of each frame). Both values can be normalized to [0 1]. These values represent the mean and standard deviation of maximum luminance of an image sequence over time and are used for adjusting global dimming at the time of display. To improve display output, it is desirable to identify a mapping reconstruction for L4 metadata as well.

In an embodiment, a mapping for std_max values follows a model characterized by:

$$z = a + bx + cy + dxy, \tag{9}$$

where a, b, c, and d are constants, z denotes the mapped std_max value, x denotes the original std_max value, and y=Smax/Dmax, where Smax denotes the maximum of PQ-encoded RGB values in the source image (e.g., Smax=L1Max described earlier) and Dmax denotes the maximum of PQ-encoded RGB values in the display image. In an embodiment Dmax=Tmax, as defined earlier (e.g., the maximum luminance of the target display), and Smax may also denote the maximum luminance of a reference display.

In an embodiment, when Smax=Dmax (e.g., y=1), then the standard deviation values should remain the same, thus z=x. By substituting these values in equation (9), one derives that: d=1−b and a=−c, and equation (9) can be rewritten as:

$$z = (a + bx)(1 - y) + xy. \tag{10}$$

In an embodiment, the parameters a and b of equation (10) were derived by applying display mapping to 260 images from a maximum luminance of 4,000 nits down to 1,000, 245, and 100 nits. This mapping provided 780 data points (of Smax, Dmax, and std_max) to fit the curve, and yielded the output model parameters:

a=−0.02 and b=1.548.

Using a single decimal point approximation for a and b, equation (10) may be rewritten as:

$$z = \text{map\_std\_max} = 0.5\,\text{std\_max}\left(3 - \frac{Smax}{Dmax}\right). \tag{11}$$

Equation (11) represents a simple relationship on how to map L4 metadata, and in particular, the std_max value. Beyond the mapping described by equations (10) and (11), the characteristics of equation (11) can be generalized as follows:

- Remapping of L4 metadata is linearly proportional. For example, images with high original std_max value will be remapped to images with a high remapped map_std_max value.
- The ratio of Smax/Dmax does decrease the map_std_max values, but at a much slower pace. Thus, images with high original std_max value will still be remapped to images of relatively high remapped map_std_max value. For example, at Smax/Dmax=1.6, map_std_max=0.7 std_max.
- When Smax/Dmax=1 there is no remapping.

Remapping when Tmax>Smax

Figure 5A:
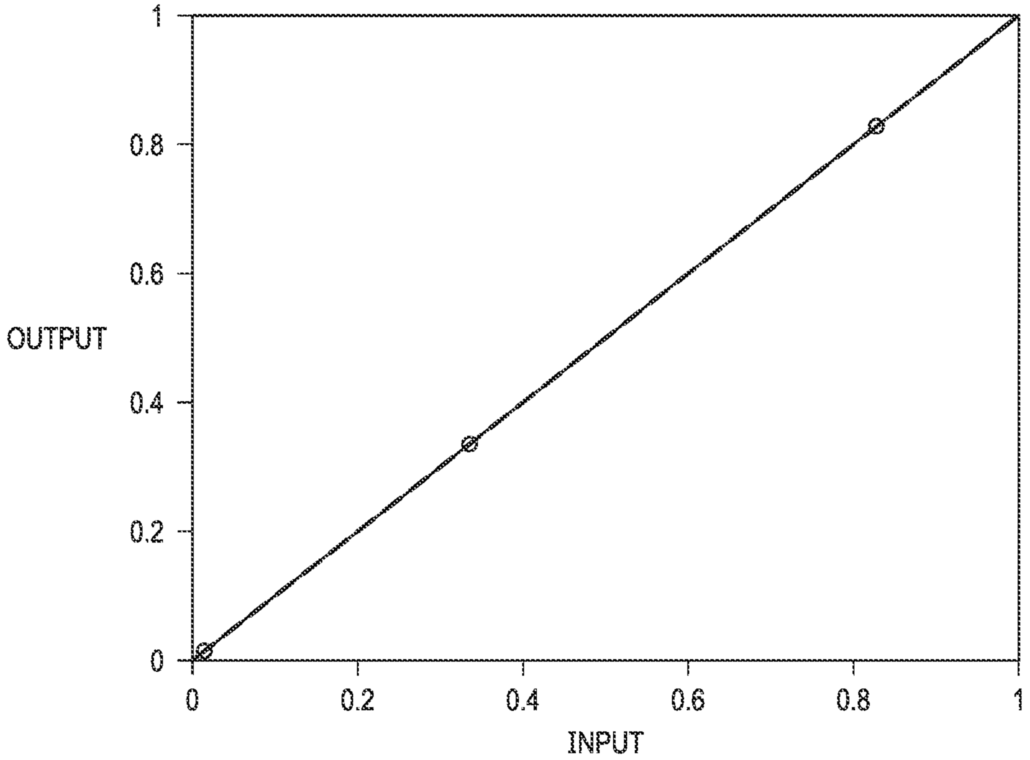
FIG. 5A and FIG. 5B depict examples of tone-mapping without "up-mapping" and after using "up-mapping" according to an embodiment.

Denote with Smax the maximum luminance of a reference display. During the direct mapping in Step 1, while the case of Tmax>Smax is allowed, that is, a target display may have higher luminance than the reference display, typically, one would apply a direct one-to-one mapping, and there would be no metadata adjustment. Such one-to-one mapping is depicted in FIG. 5A. In an embodiment, a special "up-mapping" step may be employed to enhance the appearance of the displayed image, by allowing a mapping of image data all the way up to the Tmax value. This up-mapping step may also be guided by incoming trim (L8) metadata.

Figure 5B:
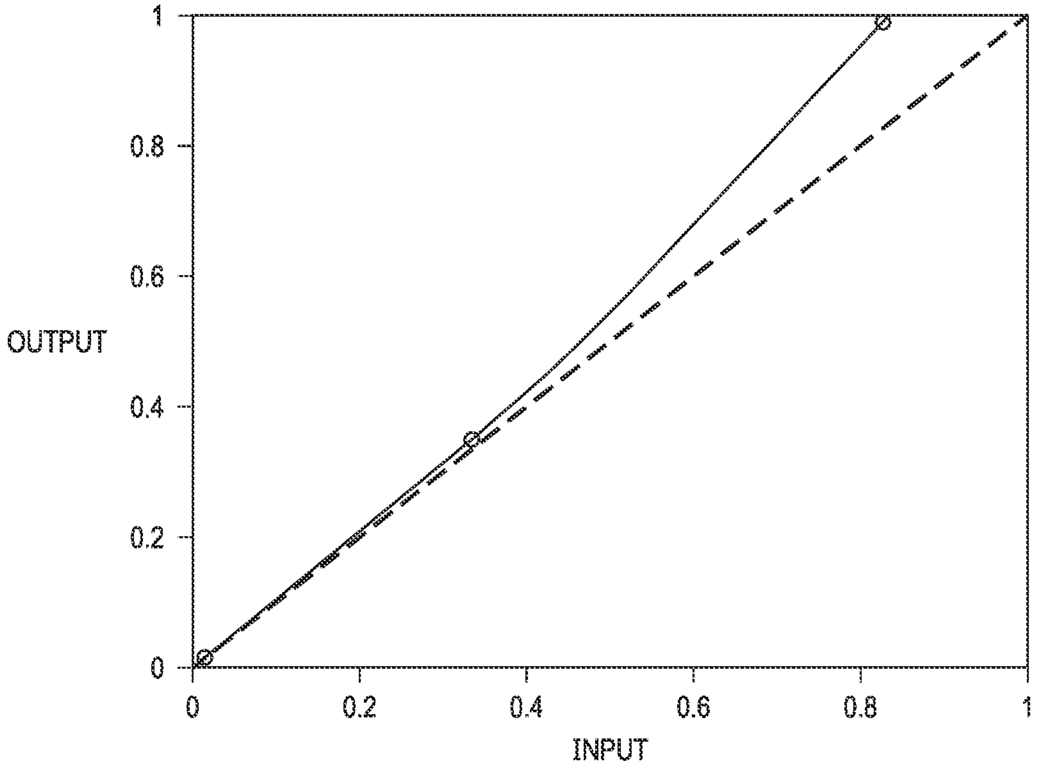

In one embodiment, the up-mapping occurs as part of Step 1 discussed earlier. For example, consider the case when Smax=2,000 nits and Tmax=9,000 nits. Consider a base layer (Bmax) at 600 nits. Assuming there are no trims to guide the up-mapping, FIG. 5B depicts an example up-mapping where input (X) PQ values [0.0151, 0.3345, 0.8274] are mapped to output (Y) PQ values [0.0151, 0.3507, 0.9889], where X=Y=1 corresponds to 10,000 nits. Input X=0.8274 corresponds to Smax=2,000 nits, and it is mapped to Y=0.9889, corresponding to 9,000 nits. Similarly, X=Smid=0.3345 is mapped to Tmid=0.3507, which represents approximately a 5% increase of the original Smid value, and X=0.0151 is mapped to Y=0.0151 using a direct 1-to-1 mapping. Thus, when there is no additional metadata or guiding information, when Tmax>Smax, one may construct a tone mapping curve using the following anchor points:

- Map Smin (minimum luminance of source display) to Tmin
- Map Smid (estimated average luminance of source display) to Tmid=Smid+c*Smid, where c is in the range of [0, 0.1]
- Map Smax to Tmax In another embodiment, if the original metadata includes trims (e.g., L8 metadata) specified for a target display with maximum luminance larger than the Smax value, then, the up-mapping is guided by those trim metadata. For example, consider Xref[i] luminance points for which Yref[i] trims are defined, e.g.:

$$Xref = [x1, x2],$$

$$Yref = [y1, y2].$$

Then, assuming linear interpolation or extrapolation, a trim for a luminance value of $$Xin > x2 \text{ will be extrapolated as } Yout = y1 * (1 - \text{alpha}) + y2 * \text{alpha}, \tag{12}$$

$$\text{where alpha} = (Xin - x1)/(x2 - x1).$$

For example, consider an incoming video source with the following L8 trims, for a trim target of 3,000 nits:

$$\text{Slope} = 0.1,\ \text{Offset} = -0.07,\ \text{Power} = 0.03,$$

Given Smax=2.000 nits, one can linearly extrapolate the above trims to get trims at a target of 9,000 nits. Extrapolation of trims happens to all the trims of L8. The extrapolated trims may be used as part of the direct mapping step in Step 1. For example, for the Slope trim value:

$$Xref = [L2PQ(2{,}000),\ L2PQ(3{,}000)] = [0.8274,\ 0.8715],$$

$$Yref = [0,\ 0.1].$$

$$\text{For } Xin = L2PQ(9{,}000) = 0.9889, \text{ from equation (12)}$$

$$\text{alpha} = 3.66$$

$$Yout = Yref(2) * \text{alpha} = 0.366,$$

where L2PQ(x) denotes a function to map a linear luminance x value to its corresponding PQ value. Similar steps can be applied to compute the extrapolated values for Offset and Power, which yields the extrapolated trims of:

$$ExtrapolatedSlope = 0.366,$$

$$ExtrapolatedOffset = -0.2566,$$

$$ExtrapolatePower = 0.1100.$$

REFERENCES

Each one of the references listed herein is incorporated by reference in its entirety.

1. U.S. Pat. No. 9,961,237, "Display management for high dynamic range video," by R. Atkins.
2. PCT Application PCT/US2020/028552, filed on 16 Apr. 2020, WIPO Publication WO/2020/219341, "Display management for high dynamic range images," by R. Atkins et al.
3. U.S. Pat. No. 8,593,480, "Method and apparatus for image data transformation," by A. Ballestad and A. Kostin,
4. U.S. Pat. No. 10,600,166, "Tone curve mapping for high dynamic range images," by J. A. Pytlarz and R. Atkins.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image transformations, such as those described herein. The computer and/or IC may compute any of a variety of parameters or values that relate to multi-step display mapping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to multi-step display mapping as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to multi-stage display mapping are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for multi-step display mapping, the method comprising:

accessing input metadata for an input image in a first dynamic range;

accessing a base layer image in a second dynamic range, wherein the base layer image is generated based on the input image;

accessing base layer parameters determining the second dynamic range;

accessing display parameters for a target display with a target dynamic range;

generating reconstructed metadata based on the input metadata, the base layer parameters, and the display parameters, wherein the reconstructed metadata comprise a reconstructed minimum value, a reconstructed average value, and a reconstructed maximum value;

generating an output mapping curve based on the reconstructed metadata and the display parameters to map the base layer image to the target display; and mapping using the output mapping curve the base layer image to the target display in the target dynamic range.

2. A method for multi-step display mapping, the method comprising:

accessing an input image in a first dynamic range;

accessing input metadata for the input image;

accessing base layer parameters determining a second dynamic range;

generating a base layer image in the second dynamic range based on the input image, the base layer parameters, and the input metadata;

accessing display parameters for a target display with a target dynamic range;

generating reconstructed metadata based on the input metadata, the base layer parameters, and the display parameters, wherein the reconstructed metadata comprise a reconstructed minimum value, a reconstructed average value, and a reconstructed maximum value; and generating an output bitstream comprising the base layer image and the reconstructed metadata.

3. The method of claim 1, wherein the base layer image has a maximum dynamic range at 1000 nits.

4. The method of claim 1, wherein the display parameters comprise minimum and maximum luminance values of the target display.

5. The method of claim 1, wherein the base layer parameters comprise minimum and maximum luminance values in the base layer image.

6. The method of claim 1, wherein the reconstructed metadata further comprise a slope, a power, and an offset values.

7. The method of claim 1, wherein generating the reconstructed metadata comprises:

generating, based on the input metadata and the display parameters, a direct mapping curve mapping the input image to the target dynamic range;

applying the direct mapping curve to luminance values in the input metadata to generate mapped luminance metadata;

generating, based on the input metadata and the base layer parameters, a first mapping curve mapping the input image to the base layer image;

mapping, using the first mapping curve, the luminance values in the input metadata to a first set of reconstructed metadata;

generating, based on the first set of reconstructed metadata and the display parameters, a second mapping curve mapping the base layer image to the target dynamic range;

mapping, using the second mapping curve, the first set of reconstructed metadata to mapped reconstructed metadata; and generating, based on the mapped luminance metadata and the mapped reconstructed metadata, a second set of reconstructed metadata comprising a slope, a power, and an offset values to adjust the second mapping curve.

8. The method of claim 7, further comprising generating, based on the direct mapping curve, the second mapping curve, and the slope, power, and offset values, a slope-adjustment value for adjusting the second mapping curve.

9. The method of claim 7, wherein the slope, power, and offset values are generated by solving a system of equations comprising:

$$TM(i) = (\text{slope} * TM'(i) + \text{offset})^{power}, \text{ for } i = 1, 2, \ldots N,$$

wherein N≥3, TM(i) denotes mapped luminance metadata, and TM'(i) denotes mapped reconstructed metadata.

10. The method of claim 9, wherein the mapped luminance metadata comprise a minimum, an average, and a maximum luminance value corresponding to mapped values using the direct mapping curve of a minimum, an average, and a maximum luminance values in the input image.

11. The method of claim 7, wherein if the maximum luminance value of the target display is larger than the maximum luminance value of a reference display, then generating the direct mapping curve comprises:

if there is no trim metadata in the input metadata:

mapping the minimum luminance of the reference display to the minimum luminance of the target display;

mapping the average luminance of the reference display to the average luminance of the target display; and mapping the maximum luminance of the reference display to the maximum luminance of the target display;

else:

given Xref[x1, x2] luminance points and corresponding trim metadata Yref[y1, y2] values, generating an extrapolated trim Yout value for luminance point Xin, wherein Xin is larger than x2, by computing $$Yout = y1 * (1 - \text{alpha}) + y2 * \text{alpha},$$

$$\text{wherein alpha} = (Xin - x1)/(x2 - x1).$$

12. The method of claim 1, wherein the input metadata comprises global dimming metadata, and given an input global dimming metadata value x, generating a reconstructed dimming metadata value z comprises computing $$z = (a + bx)(1 - y) + xy,$$

wherein a and b are constants and y denotes a ratio of the maximum luminance of the input image over the maximum luminance value of the target display.

13. The method of claim 12, wherein $$z = 0.5x(3 - y),$$

wherein for an input video sequence that includes the input image, x denotes a time-varying mean or standard deviation of the maximum luminance value in the input video sequence.

14. An apparatus comprising a processor and configured to perform the method recited in claim 1.

15. A non-transitory computer-readable storage medium having stored thereon computer-executable instruction for executing a method with one or more processors in accordance with claim 1.

16. The method of claim 2, further comprising:

receiving in a decoder the output bitstream;

decoding the output bitstream to generate a decoded base layer image and the reconstructed metadata;

generating an output mapping curve based on the reconstructed metadata and the display parameters to map the decoded base layer image to the target display; and mapping, using the output mapping curve, the decoded base layer image to the target display in the target dynamic range.

* * * * *